(12) United States Patent
Santhanam

(10) Patent No.: US 7,881,738 B2
(45) Date of Patent: Feb. 1, 2011

(54) ESTIMATION BASED APPROACH TO DETERMINE THE RETRANSMISSION TIMEOUT VALUE FOR ACCESS PROBE RETRANSMISSIONS

(75) Inventor: Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 964 days.

(21) Appl. No.: 11/609,539

(22) Filed: Dec. 12, 2006

(65) Prior Publication Data

US 2008/0139232 A1 Jun. 12, 2008

(51) Int. Cl.
*H04B 7/00* (2006.01)
(52) U.S. Cl. ..................... 455/519; 455/90.2
(58) Field of Classification Search .............. 455/519, 455/90.2
See application file for complete search history.

(56) References Cited

U.S. PATENT DOCUMENTS

| 2003/0039231 A1* | 2/2003 | Sinnarajah et al. | 370/335 |
| 2004/0017795 A1* | 1/2004 | Abraham et al. | 370/348 |
| 2009/0219984 A1* | 9/2009 | Taubin et al. | 375/232 |

FOREIGN PATENT DOCUMENTS

| EP | 1583309 | 5/2007 |
| WO | 0079721 | 12/2000 |
| WO | WO 00/79721 A2 * | 12/2000 |
| WO | 0154351 | 7/2001 |

OTHER PUBLICATIONS www.mpirical.com, FCCH Forward Common Control Channel, mpirical.com, 1 page.*
International Search Report—PCT/US2007087317, International Search Authority—European Patent Office—Rijswijk—Jun. 11, 2008.
International Preliminary Report on Patentability—PCT/US2007087317—International Search Authority—European Patent Office—RIJSWIJK—Apr. 1, 2009.
Written Opinion—PCT/US2007087317, International Search Authority—European Patent Office—Rijswijk—Jun. 11, 2008.

* cited by examiner

Primary Examiner—Kamran Afshar
Assistant Examiner—Munsoon Choo
(74) Attorney, Agent, or Firm—Robert O'Connell; Raphael Freiwirth (57) ABSTRACT

Systems and methods for reducing latency in a group communication system including transmitting an access probe; establishing predetermined criteria relating to communication parameters; and setting a retransmission timeout value at a communication device based upon the predetermined criteria, wherein the retransmission timeout value is an amount of time the communication device waits for an acknowledgment following the transmission of the access probe before it initiates retransmission of the access probe.

18 Claims, 3 Drawing Sheets

ESTIMATION BASED APPROACH TO DETERMINE THE RETRANSMISSION TIMEOUT VALUE FOR ACCESS PROBE RETRANSMISSIONS

BACKGROUND OF THE INVENTION

1. Field

The present invention generally relates towards reducing latency in a communication network. More particularly, the present invention relates to reducing initial push to talk (PTT) latency during call setup in a group communication system.

2. Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xRTT, "1x", and 1xEV-DO standards, "1xEV", for example) or TD-SCDMA.

In wireless communication systems, mobile stations or access terminals receive signals from fixed position base stations that support communication links or services within particular geographic regions adjacent to or surrounding the base stations. One or more of these base stations can be organized into a group referred to as a cell. In order to aid in providing coverage, each cell is often sub-divided into multiple sectors, each corresponding to a smaller service area or geographic region. An array or series of base stations placed adjacent to each other form a communication system capable of servicing a number of system users, over a larger region.

Typically, each mobile station monitors a control channel that can be used to exchange messages between the mobile station and the base station. The control channel is used to transmit system/overhead messages, whereas traffic channels are typically used for substantive communication (e.g., voice and data) to and from the mobile station.

For example, the control channel can be used to establish traffic channels, control power levels, and the like and is known in the art. Generally, there are two types of power control for the reverse link, open-loop and closed-loop power control. The open-loop power control typically occurs prior to the mobile terminal establishing contact with a base station. The closed-loop control occurs after the mobile and the base station are in communication and the base station can measure the received power levels and feedback power level adjustments to the mobile terminal.

In the open loop condition, the reverse link power for an initial communication signal (e.g., access probe) from the mobile terminal to the base station can be determined by monitoring specialized signals from a base station or access point. For example, in CDMA systems, a pilot signal can be used to estimate the channel condition and then determine a power estimate for transmitting back to the base station. The accuracy of the channel conditions and power estimation can greatly impact performance of the system, particularly in terms of latency of the system. For example, 1x and 1xEV systems will transmit an access probe at a first power level based on a power control algorithm. If the first access attempt does not succeed, then the probe is resent at increasingly higher power levels, until it is successful or the power level maximum is reached.

In addition to the message loss due to power related issues (e.g., channel fading, time-varying RoT, etc.), Access Channel losses can also occur because of access probe collisions may be the case in geographically dense group calls. Losses that are caused due to the fading of the wireless channel can be minimized by increasing the transmit power of access probes. Losses due to probe collisions over the Access channel can be mitigated by ensuring that probe transmissions that are synchronized with respect to each other do not transmit their probes at the same time.

Additionally, the increased data delivery capability of modern wireless communication systems has provided a platform for enhanced data services in addition to or instead of conventional voice services. Examples of such services include Voice over IP (VoIP), text and video messaging, group communications, streaming video and the like. A group communication system may also be known as a push-to-talk (PTT) system, a net broadcast service (NBS), a dispatch system, or a point-to-multi-point communication system. Typically, a group of access terminal users can communicate with one another using an access terminal assigned to each group member. The term "group member" denotes a group of access terminal users authorized to communicate with each other.

The group may operate over an existing communications system, without requiring substantial changes to the existing infrastructure. Thus, a controller and users may operate in any system capable of transmitting and receiving packet information using Internet Protocol (IP), such as a Code Division Multiple Access (CDMA) system, a Time Division Multiple Access (TDMA) system, a Global System for Mobile Communications (GSM) system, satellite communication systems, combinations of land line and wireless systems, and the like.

In conventional group communication systems, all members of the group are paged and granted access to the group communication after responding to the page. Typically, an originator access terminal initiates a request for a group communication and all members of the group (targets) are paged. As each member of the group responds to the page, they are granted access to the communication so that all members can participate/listen in on the communication.

A class of wireless services intended for quick, efficient, one-to-one or one-to-many (group) communication has existed in various forms for many years. In general, these services have been half-duplex, where a user presses a push-to-talk button on a phone/radio to initiate a group call. If granted the floor, the talker then generally speaks for a few seconds. After the talker releases the PTT button, other users may request the floor. These services have traditionally been used in applications where one person, a dispatcher, needs to communicate with a group of people, such as field service personnel or taxi drivers, which is where the dispatch name for the service comes from.

There is a need for a method to reduce latency in a group communication system.

SUMMARY OF THE INVENTION

Exemplary embodiments of the present invention are directed to systems and methods for reducing latency and improving session control in group communication systems.

Accordingly, one aspect of the invention discloses a method for reducing latency in a group communication system including transmitting an access probe; establishing predetermined criteria relating to communication parameters; and setting a retransmission timeout value at a communication device based upon the predetermined criteria, wherein the retransmission timeout value is an amount of time the communication device waits for an acknowledgment following the transmission of the access probe before it initiates retransmission of the access probe.

Another aspect of the invention can include an apparatus comprising: logic configured to transmit an access probe; logic configured to establish predetermined criteria relating to communication parameters; and logic configured to set a retransmission timeout value at a communication device based upon the predetermined criteria, wherein the retransmission timeout value is an amount of time the communication device waits for an acknowledgment following the transmission of the access probe before it initiates retransmission of the access probe.

Another aspect of the invention can include a system comprising means for transmitting an access probe; means for establishing predetermined criteria relating to communication parameters; and means for setting a retransmission timeout value at a communication device based upon the predetermined criteria, wherein the retransmission timeout value is an amount of time the communication device waits for an acknowledgment following the transmission of the access probe before it initiates retransmission of the access probe.

Another aspect of the invention can include a computer-readable media on which is stored a computer program comprising instructions which, upon being executed, causes the computing device to perform a method of: transmitting an access probe; establishing predetermined criteria relating to communication parameters; and setting a retransmission timeout value at a communication device based upon the predetermined criteria, wherein the retransmission timeout value is an amount of time the communication device waits for an acknowledgment following the transmission of the access probe before it initiates retransmission of the access probe.

BRIEF DESCRIPTION OF THE DRAWINGS

A more complete appreciation of embodiments of the invention and many of the attendant advantages thereof will be readily obtained as the same becomes better understood by the reference to the following detailed description when considered in connection with the accompanying drawings which are presented solely for illustration and not limitation of the invention, and in which.

DETAILED DESCRIPTION OF THE INVENTION

Various embodiments of the invention are disclosed in the following description and related drawings directed to specific embodiments of the invention. Alternate embodiments may be devised without departing from the spirit and scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile, and may communicate with one or more HDR base stations, referred to herein as modem pool transceivers (MPTs) base station transceivers (BTS), base stations (BS) or more generally as access points. An access terminal transmits and receives data packets through one or more modem pool transceivers to an HDR base station controller, referred to as a modem pool controller (MPC), base station controller (BSC) and/or mobile switching center (MSC). These elements are parts of a network called an access network or radio access network (RAN). An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more access points is called an active access terminal, and is said to be in a traffic state. An access terminal that is in the process of establishing an active traffic channel connection with one or more access points is said to be in a connection setup state. An access terminal may be any data device that communicates through a wireless channel and/or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the access point is called a reverse link or traffic channel. The communication link through which an access point sends signals to an access terminal is called a forward link or traffic channel. As used herein the term traffic channel can typically refer to either a forward or reverse traffic channel.

Additionally, although exemplary embodiments of the invention may be described or illustrated in terms of a wireless system and specific technologies such as CDMA 1x and 1xEV systems, those skilled in the art will appreciate that the invention is not limited to the illustrated systems. For example, embodiments of the invention can include any system that can be used to establish a group communication.

Figure 1:
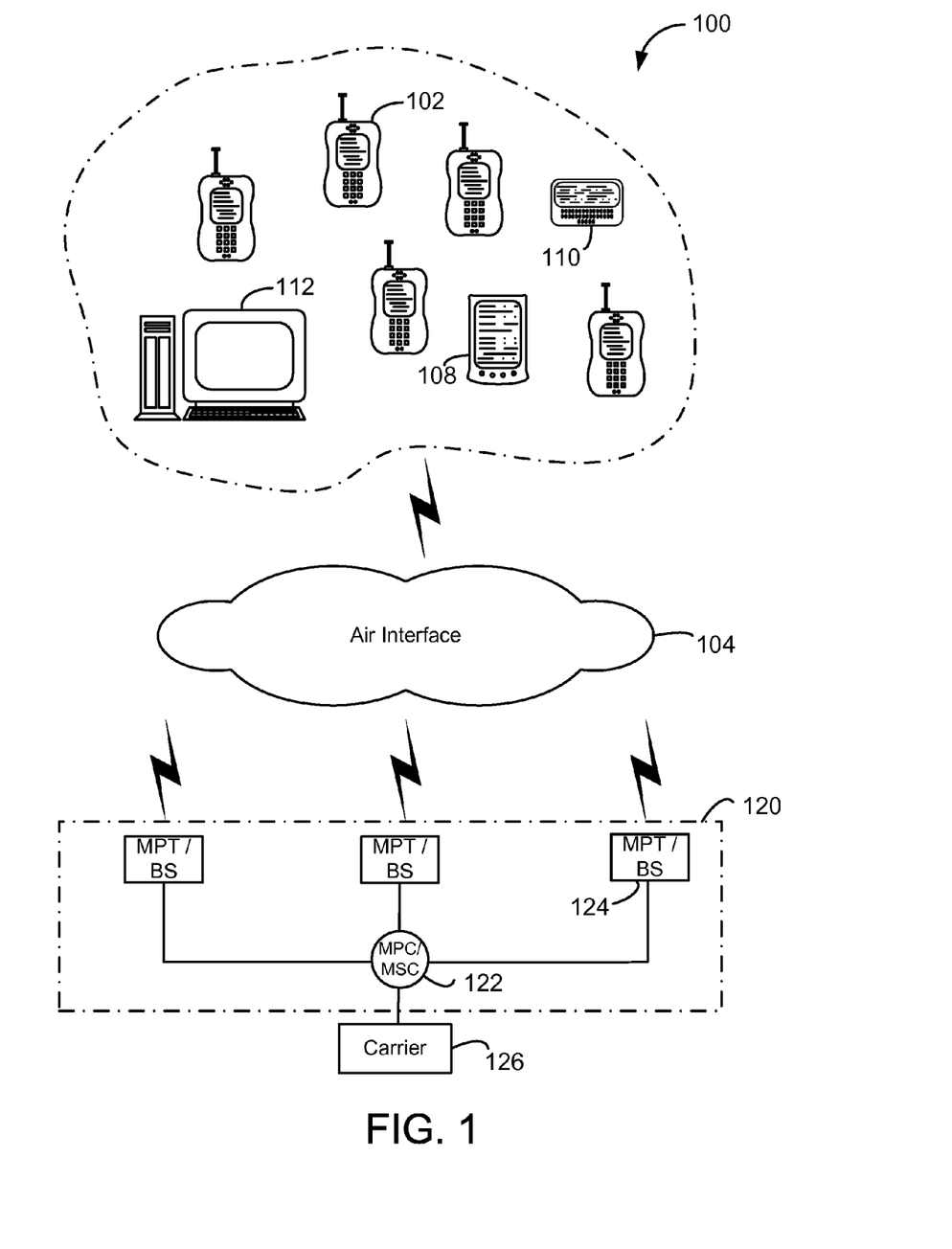
FIG. 1 is an exemplary diagram of a wireless network architecture that supports access terminals and access networks in accordance with at least one embodiment of the invention.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably. Further as used herein the terms "access point", "modem pool transceiver (MPT)", "base transceiver station (BTS)", "base station (BS)" and like variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, a core network, the Internet, and/or other remote servers.

The RAN 120 controls messages (typically sent as data packets) sent to a MPC/MSC 122. The carrier network 126 may communicate with the MPC/MSC 122 by a network, the Internet and/or a public switched telephone network (PSTN). Alternatively, the MPC/MSC 122 may connect directly to the Internet or external network. Typically, the network or Internet connection between the carrier network 126 and the MPC/MSC 122 transfers data, and the PSTN transfers voice information. The MPC/MSC 122 can be connected to multiple base stations (BS) or modem pool transceivers (MPT) 124. In a similar manner to the carrier network, the MPC/MSC 122 is typically connected to the MPT/BS 124 by a network, the Internet and/or PSTN for data transfer and/or voice communication. The MPT/BS 124 can broadcast data messages wirelessly to the access terminals, such as cellular telephone 102. The MPT/BS 124, MPC/MSC 122 and other components may form the RAN 120, as is known in the art.

Figure 2:
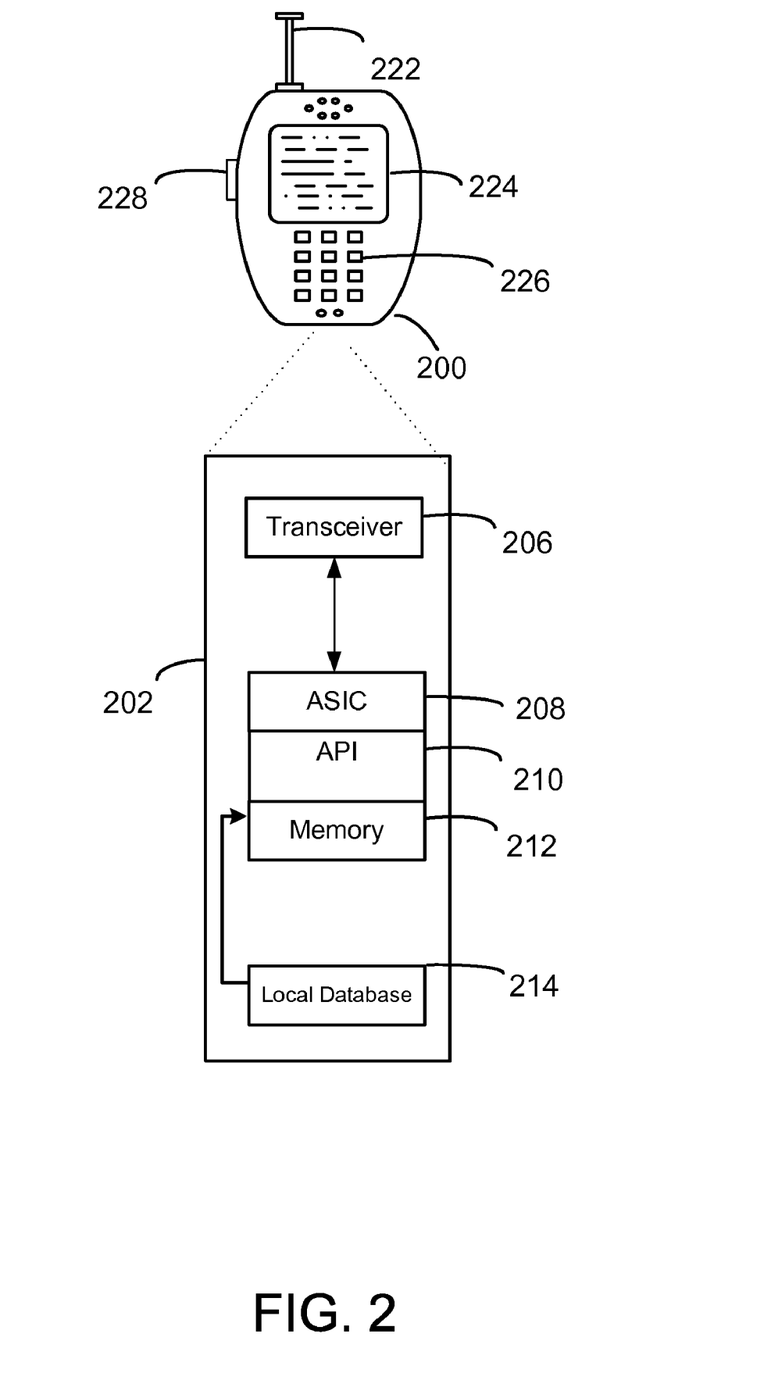
FIG. 2 is a more detailed exemplary diagram of an access terminal in accordance with at least one embodiment of the invention.

Referring to FIG. 2, the access terminal 200, (e.g. a communication device, a wireless device, a handset, etc.), such as a cellular telephone for example, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor can execute the application programming interface ("API") 210 layer that may interface with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications/data not actively used in memory 212. The local database 214 is typically a flash memory cell, but can be any secondary storage device as known in the art, such as magnetic media, EEPROM, optical media, soft or hard disk, and the like. The internal platform 202 components can also be operably coupled to external devices such as antenna 222, display 224, push-to-talk button 228 and keypad 226 among other components, as is known in the art.

Accordingly, aspects of the invention may include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 2 are to be considered merely illustrative and the invention is not limited to the illustrated features or arrangement.

As used herein "access terminal" includes, for example, one or more processing circuits executing resident configured logic, where such computing devices include, for example, microprocessors, digital signal processors (DSPs), microcontrollers, or any suitable combination of hardware, software and/or firmware containing processors and logic configured to at least perform the operations described herein. Some examples of access terminals or wireless devices which may be used in accordance with embodiments of the present invention include cellular telephones or other wireless communication units, personal digital assistants (PDAs), paging devices, handheld navigation devices, handheld gaming devices, music or video content download units, and other like wireless communication devices.

The wireless communication between the access terminal 102 and the RAN 120 can be based on different technologies, such as code division multiple access (CDMA), time division multiple access (TDMA), frequency division multiple access (FDMA), the Global System for Mobile Communications (GSM), or other protocols that may be used in a wireless communications network or a data communications network. The data communication is typically between the client device 102, MPT/BS 124, and MPC/MSC 122. The MPC/

MSC 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN 120.

As discussed in the background, a group communication system may include a group of access terminal users that communicate with one another using an access terminal assigned to each group member. Although, group communication systems/PTT systems may be considered to be among several members, the system is not limited to this configuration and can apply to communication between individual devices on a one to one basis. Group members may communicate with each other using an assigned access terminal (AT), such as ATs 102, 108, and 112. The ATs may be wireline or wireless devices such as terrestrial wireless telephones, wireline telephones having push-to-talk capability, satellite telephones equipped with push-to-talk functionality, wireless video cameras, still cameras, audio devices such as music recorders or players, laptop or desktop computers, paging devices, or any combination thereof. Furthermore, each AT may be able to send and receive information in either a secure mode, or a non-secure (clear) mode. It should be understood that reference to an access terminal (AT) is not intended to be limited to the illustrated or enumerated examples, and may encompass other devices that have the capability to transmit and receive packet information in accordance with the Internet Protocol (IP).

When a group member wishes to transmit information to other members of the group, the member may request the transmission privilege by pressing a push-to-talk button or key on an AT, which generates a request formatted for transmission over a distributed network. For example, using AT 102, the request may be transmitted over the air to one or more MPTs (or base stations) 124. A MPC/MSC 122, which may include a well-known inter-working function (IWF), packet data serving node (PDSN), or packet control function (PCF), for processing data packets may exist between MPT/BS 124 and the distributed network. However, the requests may also be transmitted through the public switched telephone network (PSTN) to a carrier network 126. The carrier network 126 may receive the request and provide it to the RAN for delivery to an access terminal.

Figure 3:
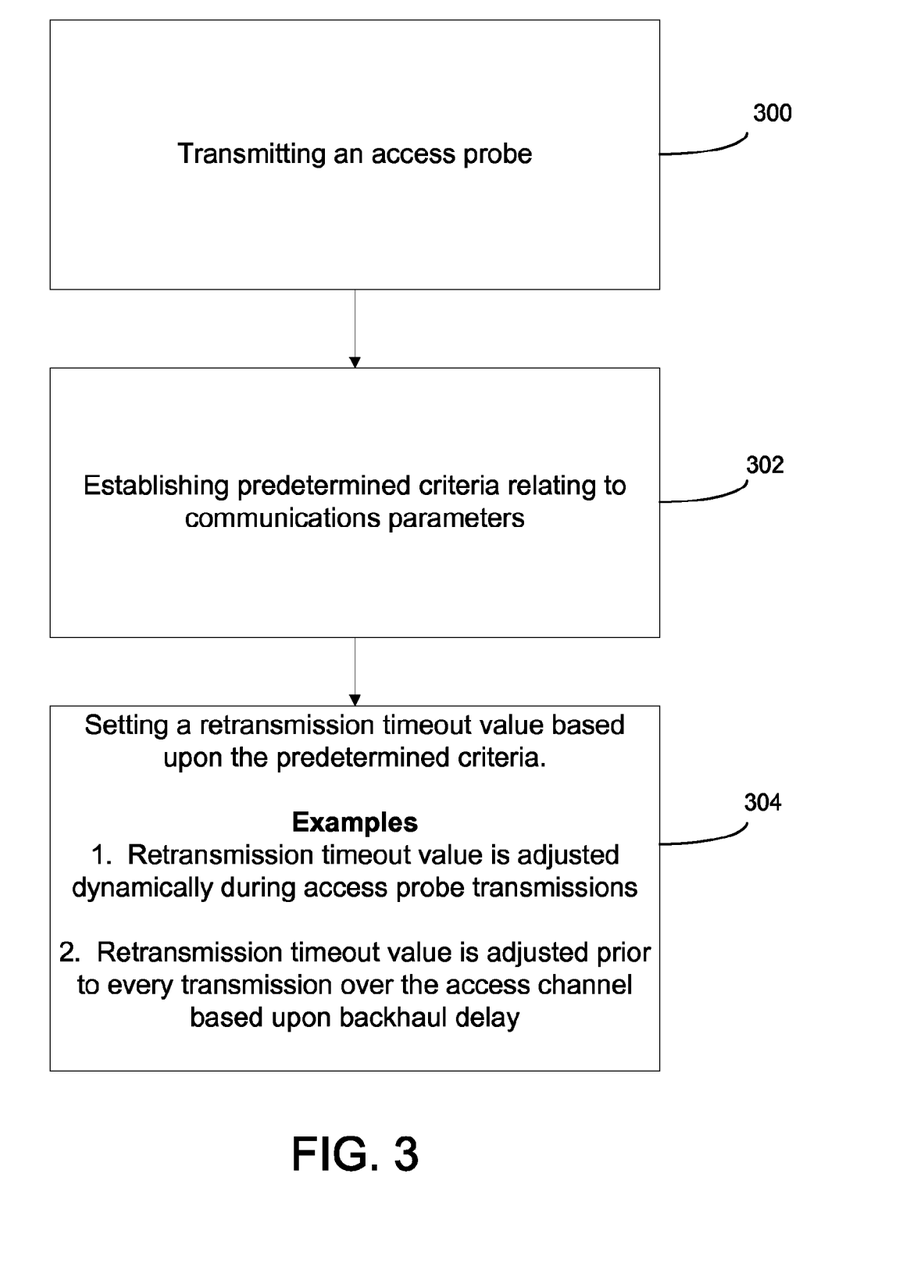
FIG. 3 is an exemplary diagram illustrating a method for reducing latency in accordance with at least one embodiment of the invention.

FIG. 3 is an exemplary diagram illustrating access probe transmissions over the Access Channel in accordance with at least one embodiment of the invention. An access probe is transmitted over the communication network 300. There is one or a plurality of predetermined criteria established relating to communication parameters 302. A retransmission timeout value based upon predetermined criteria is set 304. For example, the retransmission timeout value can be adjusted dynamically during access probe transmissions (304, example 1). In another example, the retransmission timeout value can be adjusted prior to every transmission over the access channel based on the backhaul delay (304, example 2).

Additionally, the initial transmit power (e.g., IP or $P_{init}$) is determined based on the channel load. Accordingly, both the initial random backoff and the enhanced transmit power determination is used to increase the probability of successful receipt of the access probe.

A prediction algorithm uses past observations of the backhaul delay to determine an appropriate value for subsequent access probe transmissions over the Access Channel. By exploiting the temporal correlation of the backhaul delay over short time scales, the prediction algorithm is able to set the retransmission timeout value as small as necessary.

Dynamic adjustment of the retransmission timeout value results in a significant reduction in delay, particularly when the network is lightly loaded. This characteristic is particularly useful for push to talk (PTT) calls, since it helps to reduce the initial PTT latency during call set-up.

The retransmission timeout value (e.g. ACC_TMO in CDMA 1X) is set at the handset based on the value defined in the Enhanced Access Parameters message. This value is not adjusted dynamically during access probe transmissions and can often be conservative.

The retransmission timeout value ACC_TMO is set at the handset based on the value defined in the Enhanced Access Parameters message. The retransmission timeout value is the amount of time the handset waits for a L2ACK following transmission of an access probe before it initiates retransmission of the access probe.

As an example, for a PTT access probe, this value should be set to as small a value as possible while accounting for the backhaul/processing delay as well as the OTA delay of transmitting a L2ACK (20 msec). For example, if ACC_TMO is set to 7 which is equivalent to 160 msec (=(7+1)*20). This setting implies that the expected backhaul delay is 140 msec. In a very lightly loaded system, the backhaul delay was observed to be 40 msec, a significantly lower value compared to 140 msec. One can conclude that under ideal conditions, the retransmission timeout value could potentially be set as low as 40+20=60 msec. The additional 20 msec is needed to account for the OTA delay of the L2ACK.

This would tend to indicate that the retransmission timeout value prior to every transmission over the Access Channel based on recently observed values of backhaul delay.

The retransmission timer is initialized according to the value specified by the Access Parameters message, e.g. 140+20=160 msec. Upon reception of a L2ACK following the transmission of the first message over the Access Channel.

For example, the retransmission timer value at the target handset prior to transmission of the ANNOUNCE_ACK message can be set based on the observed backhaul delay in getting an L2ACK for the 8026 Page Response message. Similarly, the retransmission timeout value for the ORIGINATION message at the target handset could take into account both the observed backhaul delay following transmission of the 8026 Page Response message as well as the backhaul delay following transmission of the ANNOUNCE_ACK message. The originator handset can set the retransmission timer value for all messages it transmits following the CALL message in a similar manner.

The main inputs in determining the retransmission timeout value are:

1. The observed backhaul delays of all prior transmissions following the first message transmission (for the new Call) over the Access Channel.

2. The autocorrelation function of backhaul delay over the F-CCCH or alternately, some parametric curve that provides us information about the temporal correlation of the backhaul delay over time-intervals.

Using the above two items as inputs and applying Levinson's algorithm, it is possible to determine the retransmission timeout value for the next probe transmission as a weighted sum of the observed backhaul delays with the weights computed by solving a series of linear equations.

If the auto-correlation function of the backhaul delay is not available as an input, a first order Autoregressive Moving Average algorithm (ARMA) can be used to determine the retransmission timeout value. This algorithm is a simple weighted moving average algorithm that evolves as:

$$ACC\_TMO(k+1)=\beta*(\alpha ACC\_TMO(k)+(1-\alpha)X\_k+n\_k),$$

Where ACC_TMO (k+1) is the retransmission timeout value set for the (k+1)th probe transmission, X_k is the observed backhaul delay following the kth probe transmission and n_k is a zero-mean random process that models random variations in the backhaul delay, α is a constant that must be set to an appropriate value that is less than 1 and β is a constant that must be set to an appropriate value that is less than or equal to 1. For example, if messages transmitted over the F-CCCH are scheduled on a frame-by-frame basis, then n_k will be distributed in the interval {−10~10} msec. If messages transmitted over the F-CCCH are scheduled on a slot-by-slot basis, then n_k will be distributed in the interval {−40~40} msec. While adjusting the retransmission timer based on previous samples of the round-trip times provides an accurate estimate of the expected time of arrival of the L2ACK, there is no significant penalty if retransmissions are initiated prior to the arrival of the L2ACK. Specifically, if the retransmission was invoked and an L2ACK message was received while retransmission procedures are in progress, then the retransmission procedures are aborted in a CDMA network. Therefore, the tolerance underestimating the retransmission timer value does not result in a significant over-the-air resource utilization (Access Channel). However, in order to limit frequency of retransmissions, the retransmission timer must not be set to an unreasonably small value. Given these trade-offs an optimal value of β can be determined. Overestimating the retransmission timer can result in additional delays in initiating retransmissions. Therefore, the prediction algorithm is biased via the parameter β to limit overestimation to a sufficiently small probability.

Those of ordinary skill in the art will recognize that other types of algorithms (e.g. autocorrelation algorithms, moving averages algorithms, etc.) may be used without departing from the spirit and scope of the present invention.

Care must be taken in determining the backhaul delay, particularly when L2ACKs are piggybacked with SDB messages. In such cases, it would be favorable if the piggybacked L2ACK precedes the SDB message transmission. Transmitting a L2ACK at the end of the SDB message can delay the arrival of the L2ACK by the OTA time of the SDB message and as a result, cause unnecessary timeouts at the handset. In the event that a piggybacked L2ACKs trails the SDB message, the backhaul delay must be determined by deducting the OTA time of the SDB message from the round-trip time of the L2ACK. In a communication system, the backhaul refers to the communication link between a controller and an access point.

Further, the arrangement of the logic elements is merely for the convenience of illustration and should not be construed as limiting embodiments of the invention. As will be appreciated by those skilled in the art, the functionality of the logic elements described herein may be integrated into one element or distributed as desired among various hardware and software elements.

Those skilled in the art will appreciate that there is no particular order of performing and executing the method functional blocks intended or implied in the preceding description. The foregoing methods discussed above can be used by themselves or in any combination thereof to achieve the same objective.

In further embodiments, those skilled in the art will appreciate that the foregoing methods can be implemented by the execution of a program embodied on a computer readable medium, such as the memory of a computer platform. The instructions can reside in various types of signal-bearing or data storage primary, secondary or tertiary media. The media may comprise, for example, RAM accessible by, or residing within, the client device and/or server. Whether contained in RAM, a diskette, or other secondary storage media, the instructions may be stored on a variety of machine-readable data storage media, such as direct access storage device (DASD) storage (e.g., a conventional "hard drive" or a RAID array), magnetic tape, electronic read-only media (e.g., ROM, or EEPROM), flash memory cards, an optical storage device (e.g. CD-ROM, WORM, DVD, digital optical tape), paper "punch" cards, or other suitable data storage media including digital and analog transmission media.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

While the foregoing disclosure shows illustrative embodiments of the invention, it should be noted that various changes and modifications could be made herein without departing from the scope of the invention as defined by the appended claims. The activities or steps of the method claims in accordance with the embodiments of the invention described herein need not be performed in any particular order. Furthermore, although elements of the invention may be described in the singular, the plural is contemplated unless the limitation to the singular is explicitly stated.

The invention claimed is:

1. A method for reducing latency in a Push-to-Talk (PTT) group communication system comprising:

transmitting an access probe;

establishing predetermined criteria relating to communication parameters; and setting a retransmission timeout value at a communication device based upon the predetermined criteria, wherein the retransmission timeout value is an amount of time the communication device waits for an acknowledgment following the transmission of the access probe before it initiates retransmission of the access probe and the retransmission timeout value is adjusted prior to every transmission over the access channel based upon an observed value of backhaul delay using a predictive algorithm to substantially minimize the retransmission timeout value.

2. The method of claim 1, wherein past observations of the backhaul delay are used to determine the retransmission timeout value.

3. The method of claim 2, wherein a determination of the retransmission timeout value includes a weighted sum of the observed backhaul delays.

4. The method of claim 1, wherein the retransmission timeout value is x milliseconds (msec) and where 60 msec≦x≦160 msec.

5. The method of claim 1, wherein a determination of the retransmission timeout value includes observed backhaul delays of prior transmissions following a first message transmission thr a new call over an Access Channel.

6. The method of claim 1, wherein a determination of the retransmission timeout value includes an autocorrelation function of backhaul delay over a forward common control channel (F-CCCH).

7. The method of claim 1, wherein a determination of the retransmission timeout value includes a parametric curve providing information regarding a temporal correlation(s) of the backhaul delay over selected time intervals.

8. The method of claim 1, wherein a determination of the retransmission timeout value includes a first order Autoregressive Moving Average algorithm.

9. An apparatus comprising:
   logic configured to transmit an access probe;
   logic configured to establish predetermined criteria relating to communication parameters; and
   logic configured to set a retransmission timeout value at a communication device based upon the predetermined criteria, wherein the retransmission timeout value is an amount of time the communication device waits for an acknowledgment following the transmission of the access probe before it initiates retransmission of the access probe and the retransmission timeout value is adjusted prior to every transmission over the access channel based upon an observed value of backhaul delay using a predictive algorithm to substantially minimize the retransmission timeout value.

10. The apparatus of claim 9, further comprising:
    logic configured to determine an appropriate value for the retransmission timeout value based upon past observations of the backhaul delay.

11. The apparatus of claim 9, wherein the retransmission timeout value is x milliseconds (msec) and 60 msec≦x≦160 msec.

12. The apparatus of claim 9, further comprising:
    logic configured to determine the retransmission timeout value including observed backhaul delays of all prior transmissions following a first message transmission for a new call over an Access Channel.

13. The apparatus of claim 9, further comprising:
    logic configured to determine the retransmission timeout value including an autocorrelation function of backhaul delay over a forward common control channel (F CCCH).

14. The apparatus of claim 9, further comprising:
    logic configured to determine the retransmission timeout value including a parametric curve providing information regarding a temporal correlation(s) of the backhaul delay over selected time intervals.

15. A system for reducing latency in a group communication system comprising:
    means for transmitting an access probe;
    means for establishing predetermined criteria relating to communication parameters; and
    means for setting a retransmission timeout value at a communication device based upon the predetermined criteria, wherein the retransmission timeout value is an amount of time the communication device waits for an acknowledgment following the transmission of the access probe before it initiates retransmission of the access probe and the retransmission timeout value is adjusted prior to every transmission over the access channel based upon an observed value of backhaul delay using a predictive algorithm to substantially minimize the retransmission timeout value.

16. The system of claim 15, wherein past observations of the backhaul delay are used to determine an appropriate value for the retransmission timeout value.

17. A non-transitory computer-readable media on which is stored a computer program comprising instructions which, upon being executed, causes the computing device to perform a method of:
    transmitting an access probe;
    establishing predetermined criteria relating to communication parameters; and
    setting a retransmission timeout value at a communication device based upon the predetermined criteria, wherein the retransmission timeout value is an amount of time the communication device waits for an acknowledgment following the transmission of the access probe before it initiates retransmission of the access probe and the retransmission timeout value is adjusted prior to every transmission over the access channel based upon an observed value of backhaul delay using a predictive algorithm to substantially minimize the retransmission timeout value.

18. The non-transitory computer readable media of claim 17, wherein past observations of the backhaul delay are used to determine an appropriate value for the retransmission timeout value.

* * * * *

UNITED STATES PATENT AND TRADEMARK OFFICE
CERTIFICATE OF CORRECTION

| | | |
|---|---|---|
| PATENT NO. | : 7,881,738 B2 | |
| APPLICATION NO. | : 11/609539 | |
| DATED | : February 1, 2011 | |
| INVENTOR(S) | : Santhanam | |

It is certified that error appears in the above-identified patent and that said Letters Patent is hereby corrected as shown below:

Column 10, line 67, claim 5: "thr a" to read as --for a--

Signed and Sealed this
Thirty-first Day of July, 2012

David J. Kappos
*Director of the United States Patent and Trademark Office*